Dec. 9, 1924.  J. MEHRLUST  1,518,745
BRACELET
Filed March 3, 1924   2 Sheets-Sheet 1
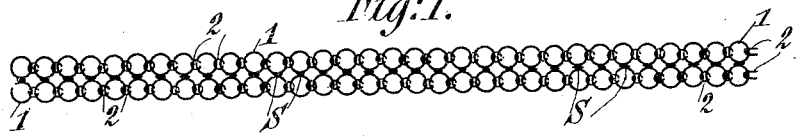
Fig:1.
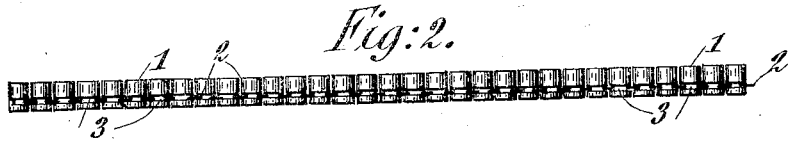
Fig:2.
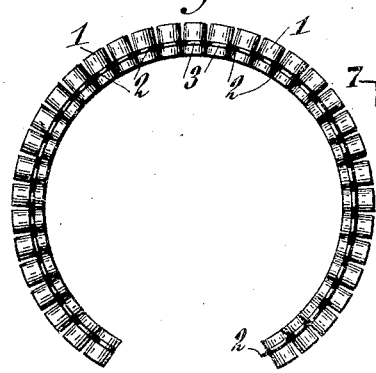
Fig:3.
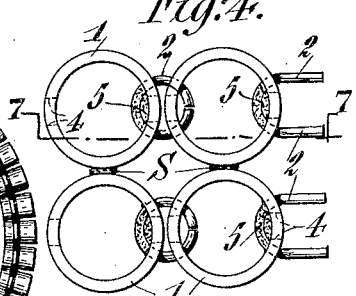
Fig:4.
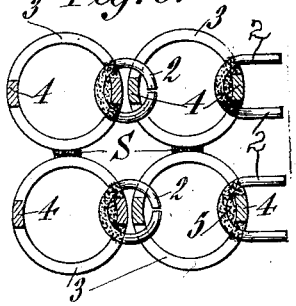
Fig:6.
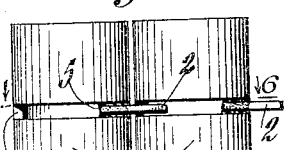
Fig:5.
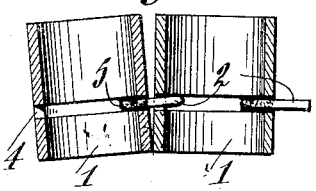
Fig:7.
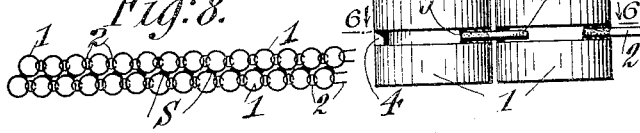
Fig:8.
Fig:9.
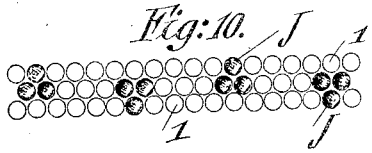
Fig:10.
Fig:11.
INVENTOR
Jacob Mehrlust
BY Mock & Blum
ATTORNEYS

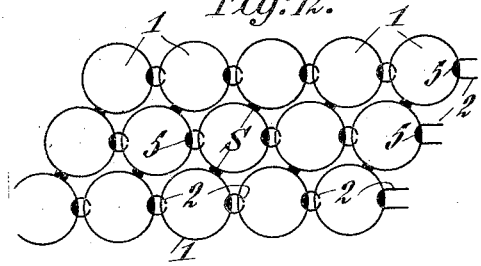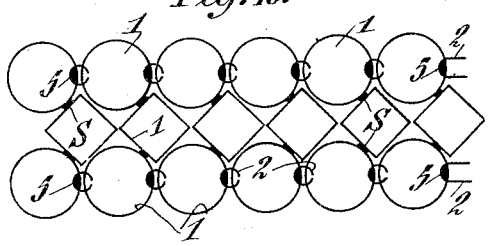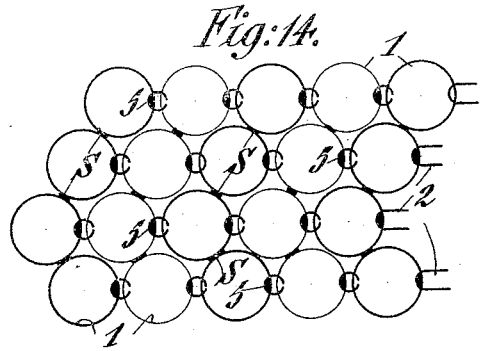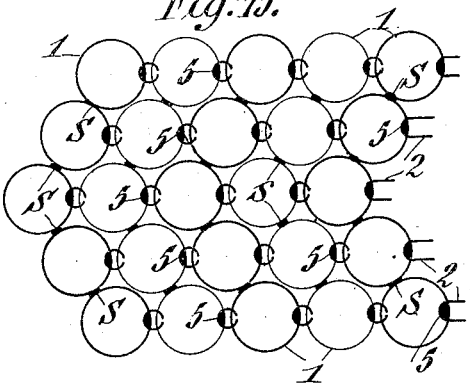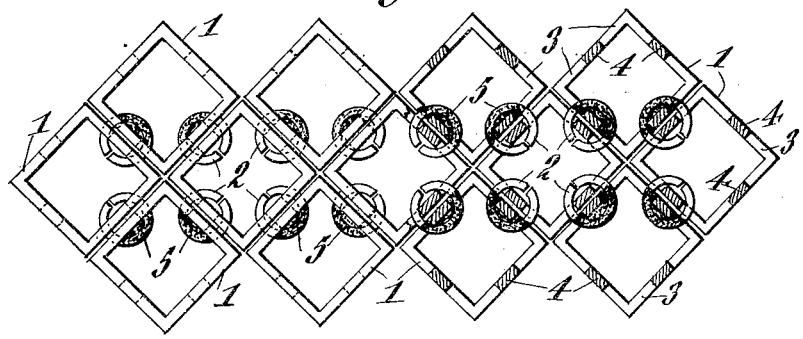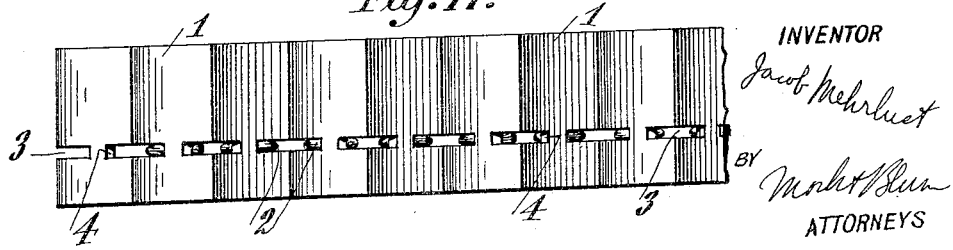

Patented Dec. 9, 1924.

1,518,745

UNITED STATES PATENT OFFICE.

JACOB MEHRLUST, OF NEW YORK, N. Y.

BRACELET.

Application filed March 3, 1924. Serial No. 696,455.

*To all whom it may concern:*

Be it known that I, JACOB MEHRLUST, a citizen of the United States, residing at New York city, in the county of New York and State of New York, have invented certain new and useful Improvements in Bracelets, of which the following is a specification.

My invention relates to a new and improved form of bracelet.

One of the objects of my invention is to devise a bracelet composed of a series of units which can be assembled so as to form a series of bracelets having different widths and in which the said units are differently arranged.

Another object of my invention is to provide a bracelet made of a series of units which are so connected that they have a limited lateral movement with respect to each other so that the bracelet which is formed of these units has sufficient flexibility and is much more rigid than the ordinary chain form of bracelet.

Another object of my invention is to provide a new and improved form of bracelet made of a series of hollow units which are especially adapted for ornamental insertions or settings such as jewels or the like.

Another object of my invention is to provide a unit for the before mentioned purposes which may have a series of shapes and can be readily connected with other similar units so as to form the bracelet.

Other objects of my invention will be set forth in the following description and drawings which illustrate a preferred embodiment thereof.

Fig. 1 is an elevation of a bracelet having two rows of units.

Fig. 2 is a side view of Fig. 1.

Fig. 3 shows the article represented in Fig. 2, after said article has been laterally bent so as to assume an arcuate form.

Fig. 4 is an enlarged top view of part of the device shown in Fig. 1.

Fig. 5 is a side view of Fig. 4.

Fig. 6 is a section on the line 6—6 of Fig. 5.

Fig. 7 is a section on the line 7—7 of Fig. 4.

Fig. 8 shows a two-row bracelet, the units of one row or series being staggered with respect to the units of the other series.

Figs. 9, 10 and 11 show different forms of decoration applicable to my new and improved bracelet. Figs. 12, 13, 14 and 15 show bracelets made by means of different combinations of the units from which my new and improved bracelets are made.

Fig. 16 is a top view showing a bracelet made of units having a square contour.

Fig. 17 is a side view of Fig. 16.

The new and improved form of bracelet is composed of a number of hollow units 1. In the devices shown in Figs. 1–15, these units 1 have a cylindrical contour and in the device shown in Figs. 16 and 17 the said units 1 have an angular or box-like contour. As clearly shown in Figs. 4 and 5, each unit 1 consists essentially of a short cylinder having two slits formed therein which are substantially perpendicular to the vertical axis of the said unit. These slits 3 are of the same dimensions and symmetrically arranged and they are separated by short vertical bridge members 4.

After each unit has been thus formed with the two slits 3 and the bridge portions 4, a U-shaped fastening member 2 is secured to one of the bridge portions 4 of each unit 1 by means of solder 5.

As clearly shown in Fig. 4 it is obvious that one of said U-shaped members 2 can be caused to enter the slits 3 of an adjacent unit 1, so that the said U-shaped member 2 embraces a free bridge portion 4, that is, a bridge portion 4 to which no fastening member 2 has been connected.

By then closing the U-shaped member which has thus been caused to surround a free bridge portion 4, so that the said fastening member 2 assumes a ring-like shape as shown in Fig. 4, a series of connected units may thus be formed.

In the embodiment shown in Fig. 1 in which there are two series or rows of the said units, each said unit is connected to the adjacent unit of the other series by means of solder S so that the bracelet is formed of a number of pairs of soldered units, each pair being connected to the adjacent pair by means of the fastening members 2 before mentioned.

As clearly shown in Fig. 7 the slits 3 are made of sufficient height to permit a certain relative movement of the adjacent units found in one of said series, the limit of the movement of each pair of units being reached when the lower corners of the adjacent units of one of said rows contact with each other.

By making this relative movement sufficiently large, a complete bracelet structure such as is shown in Fig. 3 can be formed. It is, of course, understood that the adjacent ends of the said bracelet structure shown in Fig. 3 are connected by any suitable lock which is not illustrated in the drawings as this detail in itself forms no part of my invention.

A bracelet thus formed has much more firmness than the ordinary chain form and it can be made to fit so snugly that there is little or no danger of the bracelet falling from the hand of the wearer.

The hollow units are especially adapted for the insertions of jewels J in various patterns or designs such as are shown in Figs. 9, 10 and 11.

In Fig. 8 the units of one of said series are staggered with respect to the adjacent units of the other series. In this embodiment the bracelet is formed of pairs of units, each said pair being connected along a line which is inclined to the axis of the bracelet. When the bracelet shown in Fig. 8 is bent to assume the contour shown in Fig. 3, there is a tendency for the ends of the bracelet to separate along a line parallel to the axis of the bracelet but this does not prevent a proper and satisfactory bracelet structure from being formed.

The embodiment shown in Fig. 12 illustrates a three-row bracelet made of cylindrical units. The bracelet is formed in this embodiment of sets of three and the three units forming each set are soldered to each other along a straight line which is inclined to the axis of the bracelet.

In the embodiment shown in Fig. 13 the outer series of units are cylindrical and the central series of units is angular. The bracelet is formed in this embodiment of sets of units, each set comprising two outer cylindrical members and an intermediate box-like member which is offset. Two of the adjacent faces of the angular member are connected to the outer cylindrical members by means of solder S. The solder S connecting the angular unit of each set to the outer cylindrical units is close to but somewhat offset from the line of movement which may be considered as passing through the central portions of the fastening members 2. It will be noted that only the outer members of the embodiment shown in Fig. 13 are connected by fastening members 2.

In the embodiment shown in Fig. 14 where there are four series or rows of cylindrical units, the bracelet is composed of sets of four units. Each set consists of three adjacent units soldered to each other along a line inclined to the axis of the bracelet while the fourth unit is soldered along a line oppositely inclined to the axis of the bracelet.

The embodiment shown in Fig. 15 is made up in substantially the same way as the embodiment shown in Fig. 14. The bracelet is formed of sets of five units, each set comprising three units soldered along a line inclined to the axis of the bracelet, and of two units soldered to each other and to one of the first mentioned three units, along a line oppositely inclined to the axis of the bracelet.

In the embodiments shown in Figs. 16 and 17, the bracelet is formed of three rows of angular units. The bracelet may be considered as being composed of sets of four units whose outer faces form a rectangle, the adjacent faces of the said four units of each said set being connected to each other by fastening members 2.

I have described some preferred embodiments of my invention and pointed out some of the possibilities which can be secured by proper combinations of the units before described but it is obvious that the embodiments before described are merely offered by way of illustration and that my invention is not limited to the details before described.

Thus the tubular units above mentioned can be made not only in the shapes illustrated herein but in a variety of other shapes so that by the expression "tubular unit" wherever it is found in the description and claims I include every hollow article and every article provided with the openings and bridge-like portions above mentioned.

I claim:

1. A unit for a bracelet or the like comprising a tubular structure having a plurality of slits formed in the body thereof so as to leave bridge-like portions intermediate the said slits, one of said bridge-like portions having a fastening member connected thereto.

2. In a bracelet or the like, the combination of a plurality of like units, each said unit comprising a tubular structure having a plurality of slits formed in the body thereof so as to leave intermediate bridge-like portions, each said unit having a fastening member connected to one of said bridge-like portions, the said units being so disposed that the fastening member of one of said units encircles a free bridge-like portion of the adjacent unit whereby the said units are movably connected.

3. A bracelet consisting of a plurality of like units arranged in series, each unit of one of said series comprising a tubular structure connected to the adjacent members of the said series, the said connection permitting a limited free angular movement between adjacent connected units, so that the inner ends of the said units contact with each other when the bracelet is bent to arcuate form and the outer ends of said units are spaced from each other when the said bracelet is bent to arcuate form.

4. A bracelet composed of a plurality of units arranged in a plurality of series, the units of each said series being arranged in staggered relationship with respect to the units of the adjacent series, the units of each series being movably connected with respect to each other and being immovably connected to the adjacent units of the adjacent series, the said connections permitting a free relative movement between the adjacent units of each series, whereby the bracelet can be bent into arcuate form.

5. A bracelet according to claim 4 in which the units of the respective series are connected to each other along lines inclined in opposite directions to the axis of the said bracelet.

6. A bracelet composed of a series of angular tubular units, each said unit having a plurality of slits formed in the body thereof so as to leave bridge-like portions intermediate the said slits, the said bridge-like portions on a plurality of adjacent faces having fastening members connected thereto, each said fastening member encircling a free bridge-like portion on a like adjacent unit.

In testimony whereof I hereunto affix my signature.

JACOB MEHRLUST.